United States Patent
Zhou et al.

(10) Patent No.: US 9,537,410 B2
(45) Date of Patent: Jan. 3, 2017

(54) SYSTEM AND METHOD FOR SERIES CONNECTING ELECTRONIC POWER DEVICES

(71) Applicant: General Electric Company, Schenectady, NY (US)

(72) Inventors: Rui Zhou, Niskayuna, NY (US); Luis Jose Garces, Niskayuna, NY (US); Ravisekhar Nadimpalli Raju, Clifton Park, NY (US); Rixin Lai, Clifton Park, NY (US); Di Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 81 days.

(21) Appl. No.: 14/482,969

(22) Filed: Sep. 10, 2014

(65) Prior Publication Data

US 2016/0072375 A1 Mar. 10, 2016

(51) Int. Cl.
*H02M 3/335* (2006.01)
*H02M 1/44* (2007.01)
*H02M 1/00* (2006.01)
*H02M 7/483* (2007.01)

(52) U.S. Cl.
CPC .......... *H02M 3/33569* (2013.01); *H02M 1/44* (2013.01); *H02M 2001/0058* (2013.01); *H02M 2007/4835* (2013.01)

(58) Field of Classification Search
CPC .......................... H02M 3/335; H02M 3/33569
USPC .......... 363/46, 41, 15–17, 20, 21.04, 21.01, 363/21.12, 21.4, 21.18, 71, 67, 69, 95, 363/98, 84, 89, 131, 132
See application file for complete search history.

(56) References Cited

U.S. PATENT DOCUMENTS

| | | |
|---|---|---|
| 2,957,993 A | 10/1960 | Sichling |
| 3,198,964 A | 8/1965 | Grunwaldt |
| 3,441,875 A | 4/1969 | Shoh |
| 3,710,147 A | 1/1973 | Lee |
| 4,670,667 A | 6/1987 | Petit |
| 4,900,955 A | 2/1990 | Kurpan |
| 7,071,763 B2 | 7/2006 | Blyth |

(Continued)

OTHER PUBLICATIONS

Bredenkamp, G.L.; Nel, J.J.; Mulder, D.J.; Transient Voltage Sharing in Series Coupled High Voltage Switches; Digest of Technical Papers. Eighth IEEE International Pulsed Power Conference, 1991.; pp. 1016-1019; Jun. 1991.

(Continued)

*Primary Examiner* — Adolf Berhane
*Assistant Examiner* — Nusrat Quddus
(74) *Attorney, Agent, or Firm* — Robert M. McCarthy (57) ABSTRACT

A system and method for series connecting electronic power devices are disclosed. In one embodiment, a switching device system includes a first upper arm electrically coupled to a first lower arm and a second upper arm electrically coupled to a second lower arm. Each of the arms include a plurality of low voltage sub-modules connected in series and each plurality of low voltage sub-modules includes an auxiliary switching device, a series switching device, and a capacitor. Each plurality of low voltage sub-modules is configured to be sequentially switched using the auxiliary switching device and the series switching device separately in the upper arms and the respective lower arms to control change in voltage over time (dV/dt) while selectively blocking a desired high voltage. Further, a capacitor voltage balancing (sorting or rotating) algorithm may be used to actively balance voltage across each plurality of low voltage sub-modules.

20 Claims, 7 Drawing Sheets

(56) References Cited

U.S. PATENT DOCUMENTS 8,599,591 B2 12/2013 Crookes et al.
2012/0230076 A1 9/2012 Palmer et al.

OTHER PUBLICATIONS

Withanage, R.; Shammas, N.; Series Connection of Insulated Gate Bipolar Transistors (IGBTs); IEEE Transactions on Power Electronics vol. 27, Issue 4 pp. 2204-2212; Apr. 2012.

SYSTEM AND METHOD FOR SERIES CONNECTING ELECTRONIC POWER DEVICES

BACKGROUND

The subject matter disclosed herein relates to electronic power devices and, more specifically, to connecting low power electronic devices in series to achieve higher voltage.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain applications in the oil and gas, medical imaging, communications, and automation industries, among others, may require high voltage to operate. Some of these applications may use a single high voltage power device included in a motor drive, power factor controller, DC to DC converter, or the like, capable of blocking the desired high voltage. However, the high voltage power device may produce a high instantaneous rate of voltage change (dV/dt) due to the single switch and large amount of voltage applied, which may lead to issues such as electromagnetic interference (EMI). Other applications may utilize several power devices connected in series to block the desired high voltage. Typically, though, the series connected power devices are switched simultaneously, which may also produce a high dV/dt like the single high voltage power device and cause EMI. Further, the series connected power devices may utilize a passive network that inefficiently balances voltage, thereby causing higher loss.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the present disclosure. Indeed, the disclosed techniques may encompass a variety of forms that may be similar to or different from the embodiments set forth below.

In a first embodiment, a switching device system including a first upper arm electrically coupled to a first lower arm. Each of the arms include a plurality of low voltage sub-modules connected in series and each plurality of low voltage sub-modules includes a series switching device, an auxiliary switching device, and a storage element. Each plurality of low voltage sub-modules is configured to be sequentially switched using the series switching device and the auxiliary switching device separately in the first upper arm and the first lower arm to control the change in the arms output voltage with a reduced rate of change (dV/dt).

In a second embodiment, a method of operating a switching device includes monitoring output voltages from capacitors of a plurality of low voltage sub-modules connected in a series on at least an upper arm and a lower arm, wherein the upper arm is electrically coupled to the lower arm. The method further includes determining differences in the output voltages of the capacitors, determining lengths of pulses for each of the plurality of sub-modules based on the determined differences, determining an order to pulse the plurality of sub-modules based on the determined length of pulses, and operating the plurality of sub-modules using the determined pulse lengths and pulse order to output a desired high voltage.

In a third embodiment, a method for operating a switching device includes sorting or rotating a plurality of low voltage sub-modules electrically connected in a series in an upper arm and a lower arm to actively balance the output voltage of capacitors of each of the plurality of low voltage sub-modules near equivalently. The upper arm is electrically coupled to the lower arm. The method further includes switching the plurality of low voltage sub-modules sequentially as determined during the sorting or rotating to control change in voltage over time (dV/dt) and to output a desired high voltage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

For purposes of discussion, an H-bridge circuit may be referenced to illustrate the present techniques, but it should be understood that the disclosed techniques of connecting low voltage power devices in series to provide a desired high voltage with controlled dV/dt and actively balanced voltage may be incorporated into any suitable circuit. For example, the H-bridge discussed below may include four arms, however, any number of arms may be utilized (e.g., six arms for three phase power (two for each phase)). As may be understood, an H-bridge is a circuit that enables a voltage to be applied across a load (e.g., a motor) in either direction. H-bridge circuits may be used in DC to DC converters, among other applications.

As previously discussed, applications requiring high voltage may use a single power device or series connected power devices capable of blocking a desired voltage. To illustrate, an oil and gas application may require a high efficiency DC to DC converter capable of converting 10 kV DC to 10 kV DC. In order to achieve the conversion, a high frequency circuit may be used and configured to switch at 20 kHz, for example. Utilizing a single power device capable of such a conversion may not be desirable due to the large instantaneous rate of voltage change (dV/dt) produced and the side effects of any associated EMI. Thus, an alternative way to block the desired voltage may be to connect power devices in series. However, a high voltage power device, like a 4.5 kV power device tends to switch at a lower frequency than 20 kHz because switching losses may be substantial for each switch. Therefore, connecting such high voltage power devices in series may not solve the problem. Accordingly, lower voltage power devices may be desirable because their switching losses are lower than their higher voltage (4.5. kV) counterparts. As previously mentioned, though, series connected power devices are typically switched simultaneously, which may cause a high dV/dt leading to EMI similar to a single high voltage power device. Additionally, a passive network that is often used to balance the voltage between the series connected power devices may lead to higher power loss.

Thus, present embodiments relate to connecting low voltage (e.g., 1.2 kV, 1.7 kV) power devices in series to block a desired high voltage with a controlled dV/dt of output voltage and an actively balanced voltage sharing algorithm to inhibit loss. In essence, the series connected low voltage power devices may act as one high voltage power device. In certain embodiments, a modified H-bridge may include four modules, one for each arm of the modified H-bridge. The modules may include a plurality of sub-modules that further include two switching devices and a storage element (e.g., capacitor). The sub-modules may be connected in series within each module. The total cell voltage for the module is the summation of the sub-modules output voltages. For example, six individual sub-modules' capacitor's voltages can be actively balanced so that they each output 1 kV cell voltage but together block 6 kV of total output cell voltage when the module is turned on.

Further, in some embodiments, the dV/dt slope may be controlled by sequentially operating a sub-module in an upper arm of the modified H-bridge and operating a sub-module in the lower arm of the modified H-bridge one at a time until all the sub-modules in both arms have been operated. Any number of sub-modules may be utilized depending on their voltage blocking capabilities and the desired total voltage to be blocked. That is, sub-modules may be added or removed from each module to output a desired total cell voltage. The voltage generated by the module may be pulse width modulated (PWM) but the leading and falling edges of the pulse may appear as steps instead of as vertical lines due to the sequential switching. The controlled dV/dt slope may inhibit EMI. Further, certain embodiments may monitor the voltage across each sub-module via sensors to regulate the voltage of a capacitor of each sub-module as equivalently as possible. One or more communicably coupled analog or digital controllers (e.g., processors) may execute a capacitor voltage balancing algorithm (e.g., sorting, rotating) using the capacitor voltages to determine how long and in what order to pulse each sub-module to actively balance the voltage near equally across each sub-module, thereby inhibiting power loss and/or over-voltages. In some embodiments, the controllers may execute an observer algorithm that measures the current supplied to the circuit and uses the measured current and the size of the storage element (e.g., capacitor) to estimate the values of the voltages without the use of a sensor.

Figure 1:
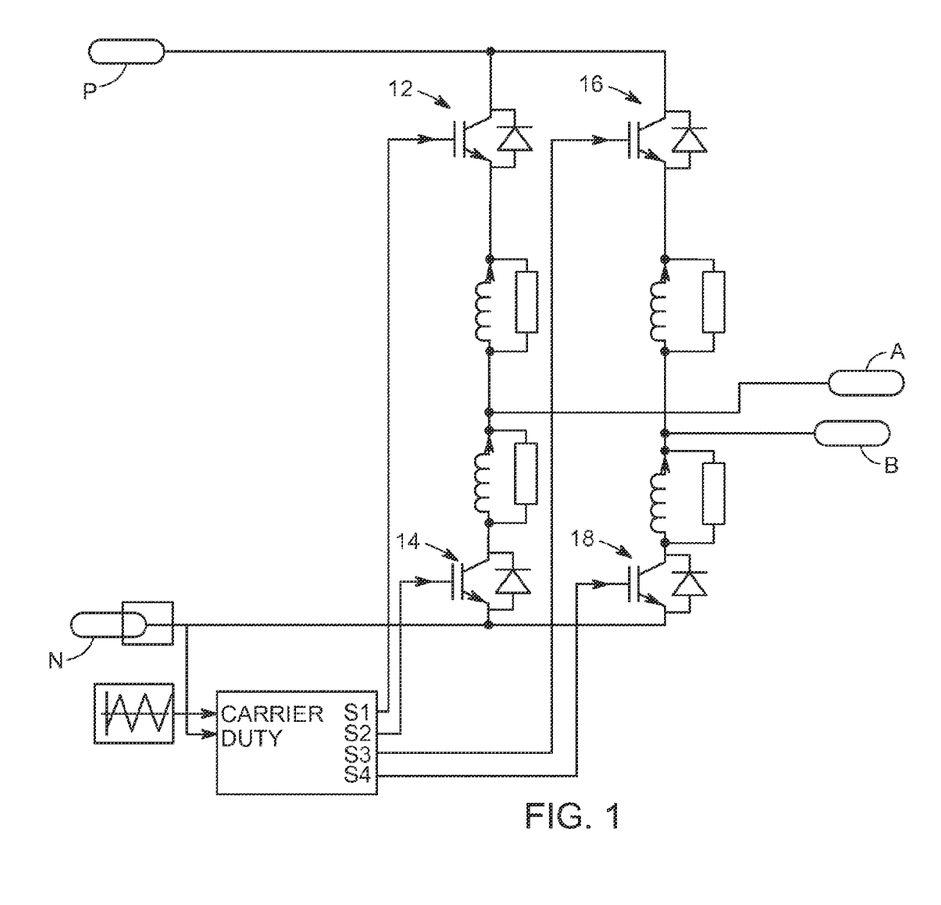
FIG. 1 is an H-bridge circuit with individual switching devices.

Turning now to FIG. 1, an unmodified H-bridge circuit 10 with four individual switching devices 12, 14, 16, and 18 is shown. Depending on the configuration of the H-bridge with the load, the switching devices 12, 14, 16, and 18 may be operated in coordination to provide voltage to the load in either direction. That is, if switching devices 12 and 18 are on and the switching devices 14 and 16 are off, current may be provided by the H-bridge to the load (e.g., motor), and the load may be charging in a first direction (e.g., forward). Alternatively, if switching devices 14 and 16 are on and the switching devices 12 and 18 are off, current may be flowing through the H-bridge to the load, and the load may charging in a second direction (e.g., backwards). The switching devices 12, 14, 16, and 18 may be metal oxide semiconductor field-effect transistors (MOSFETs), insulated-gate bipolar transistors (IGBTs), or the like. The switching devices 12, 14, 16, and 18 in the H-bridge 10 are individuals in that there is one switching device per arm of the H-bridge 10 and, thus, the voltage blocking capability of the H-bridge 10 is equivalent to the voltage blocking capability of the individual switching devices 12, 14, 16, and 18 used. For example, if switching device 12 is capable of blocking 6 kV, then the H-bridge 10 is capable of blocking 6 kV. However, as discussed above, a single high voltage power device (e.g., switching device) includes drawbacks, such as a high dV/dt resulting from the single high voltage applied during switching that leads to EMI. If the H-bridge 10 is connected to a load, such as a motor, the EMI may cause dV/dt reflections in the motor. The reflection waves may cause higher peak voltage by encountering and adding with other voltage waves. Higher peak voltage may affect the motor's operation in a negative way. Another drawback of a single high voltage switching device may include lower switching frequency due to high loss resulting from the size of the switching device.

Figure 2:
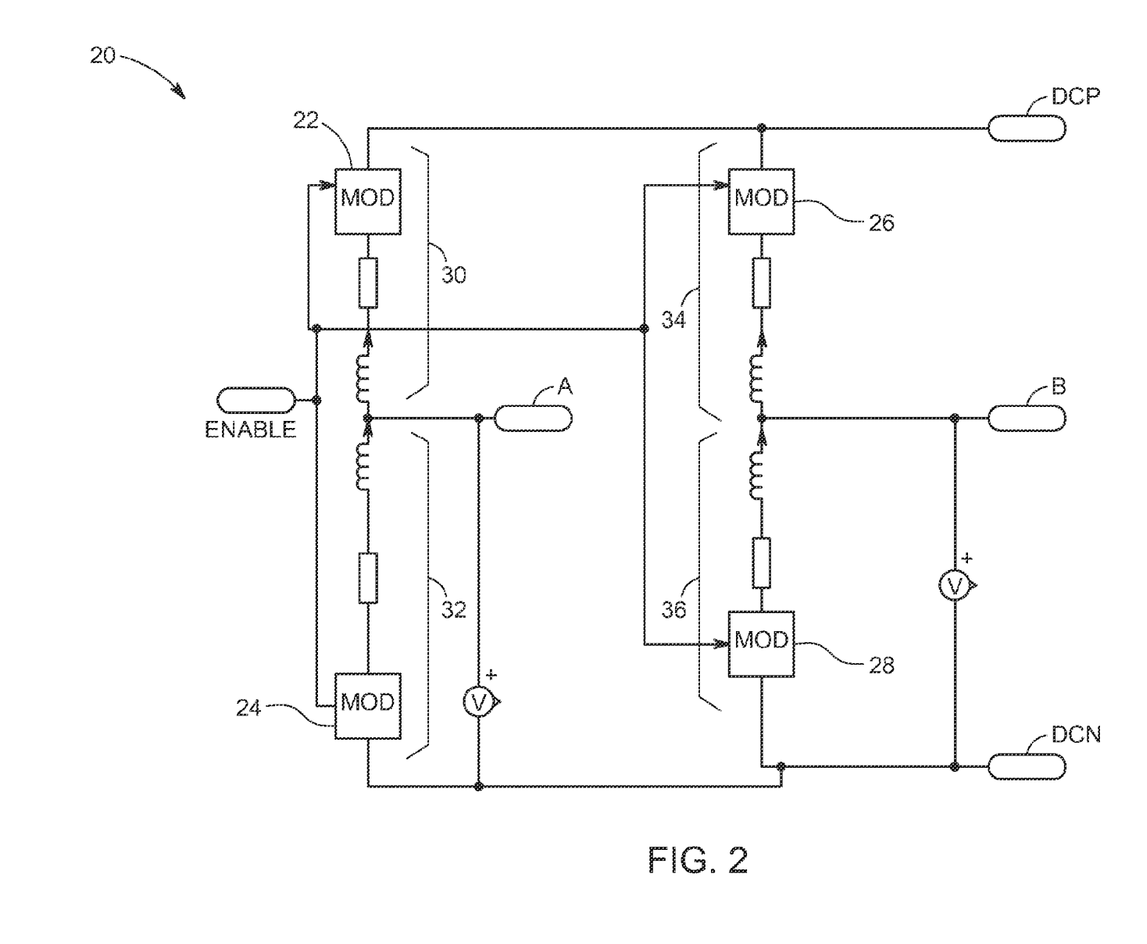
FIG. 2 is a modified H-bridge circuit with modules including low voltage power devices connected in series, in accordance with an embodiment.

An embodiment of a modified H-bridge circuit 20 is illustrated in FIG. 2 that overcomes the disadvantages described above. The modified H-bridge 20 may include four modules 22, 24, 26, and 28, one connected to each arm 30, 32, 34, and 36, respectively, of the modified H-bridge 20. As noted above and described in more detail below, each module 22, 24, 26, and 28 may include a plurality of sub-modules connected in series. Thus, the current through components of the sub-modules is the same, and the output voltage of each module 22, 24, 26, and 28 is the sum of the voltages across each of their respective sub-modules. Series connecting a plurality of sub-modules enables granular control over the dV/dt of the output voltage from each module 22, 24, 26, and 28 because operation of each sub-module may be sequentially orchestrated amongst modules, thereby inhibiting the high dV/dt produced by a single high voltage power device and the associated EMI. Further, sensors may be used across each sub-module to monitor various characteristics such as voltage, current, temperature, and the like. In some embodiments, one or more controllers may execute an observer algorithm that measures the current supplied to the circuit and uses the measured current and the size of the storage element (e.g., capacitor) to estimate the values of the voltages without the use of a sensor. The observer algorithm may be computer instructions executable by a processor or control circuitry and may be stored on one or more non-transitory, computer-readable medias (e.g., memories). The data obtained by the sensors or provided by the observer may be used by a capacitor voltage balancing algorithm to determine the order in which to pulse the sub-modules and the length of the pulses for the sub-modules. For example, the sensor data or observer data may enable a controller to determine which sub-module produces a higher or lower voltage and to modify the sub-module's pulse to be longer or shorter accordingly. In this way, the voltage across each sub-module may be equally balanced and distributed to inhibit power loss.

Figure 3:
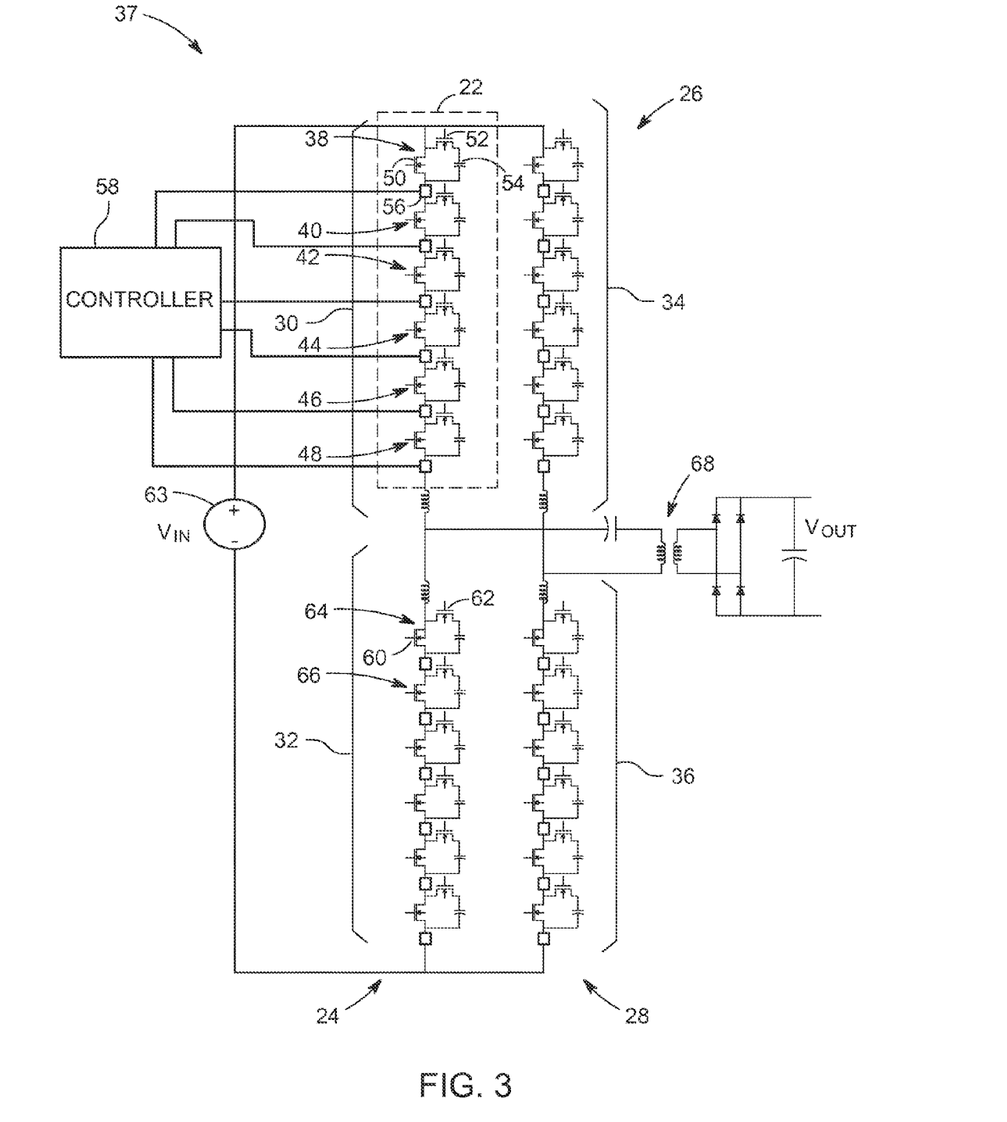
FIG. 3 is a modified H-bridge circuit illustrating sub-modules with low voltage power devices connected in series that are included in the modules from FIG. 2, in accordance with an embodiment.

With this in mind, a more detailed H-bridge circuit 37 including the modules 22, 24, 26, and 28 and their respective sub-modules is shown in FIG. 3. As illustrated, module 22 includes six sub-modules 38, 40, 42, 44, 46, and 48 connected in series. However, it should be understood that any number of sub-modules may be included in the modules 22, 24, 26, and 28 depending on the desired voltage to be output by the modules. Each sub-module 38, 40, 42, 44, 46, and 48 includes a series switching device 50, an auxiliary switching device 52, and a storage element, such as a capacitor 54. Further, each sub-module 38, 40, 42, 44, 46, and 48 may include one or more sensors 56 configured to obtain data related to output voltage, current, temperature, or the like, and to transmit the data to one or more controllers 58 for analysis. In some embodiments, an observer algorithm may be executed by the controllers 58 and the observer may estimate the voltage values of the sub-modules by using measured current and the size of the storage controller 58. In the illustrated embodiment, the series switching device 50 and the auxiliary switching device 52 may be low voltage (e.g., 1.2 kV, 1.7 kV) silicon-carbide (SiC) MOSFETs. Advantages of using SiC MOSFETs may include increasing frequency of operation and power density, which may enable reducing the size of the modules 22, 24, 26, and 28 and inhibiting switching losses. However, in some embodiments, other switching devices may be used, such as silicon (Si) MOSFETs, IGBTs, and the like.

Each sub-module 38, 40, 42, 44, 46, and 48 is capable of outputting two voltage levels because each sub-module includes two switching devices 50 and 52. For example, when the auxiliary switching device 52 is on and the series switching device 50 is off the sub-module outputs the capacitor's voltage, and when the series switching device is on and the auxiliary switching device is off the sub-module outputs zero voltage. Also, a series connected sub-module with its auxiliary switching device 52 on will provide its capacitor's voltage to a linked sub-module when its auxiliary switching device 52 is switched on. Thus, the characteristics of the components of each sub-module may be similar so switching delays are reduced and providing excessive voltage to linked sub-modules is inhibited. Example characteristics may include the switching speed, charging time, voltage rating, and so forth. Therefore, in some embodiments, as will be described in detail below, the capacitor voltage for each sub-module may be monitored using sensors 56 and actively balanced as equivalently as possible among the sub-modules to inhibit power loss and extend the life of the components. In other embodiments, an observer may measure the current supplied to the circuit and use the measured current with the size of the storage element (e.g., capacitor) to estimate the values of the voltages without the use of a sensor.

In the depicted embodiment, the desired voltage is 6 kV. Thus, each of the six sub-module's output voltage will be regulated to produce approximately 1 kV in order to block a total cell voltage of 6 kV since, as mentioned above, the total cell voltage is the summation of each sub-module's output voltage. Accordingly, it should be understood that the disclosed techniques enable arranging any number of sub-modules to block a desired high voltage. For example, in applications where 8 kV is desired, eight sub-modules capable of outputting at least 1 kV can be connected in series in a module. Then, the eight sub-modules may each be regulated to produce approximately 1 kV, thereby blocking the desired 8 kV by acting as a single high voltage power device. Alternatively, four sub-modules capable of outputting at least 2 kV can be connected in series in a module, and the four sub-modules may each be regulated to produce approximately 2 kV, thereby blocking the desired 8 kV.

To control the dV/dt of output voltage from the H-bridge circuit 37, the sub-modules of the arms 30, 32, 34, and 36 can be operated sequentially. Controlling the dV/dt may inhibit EMI, as previously discussed. To illustrate the sequential switching process, the module 22 of the upper left arm 30 may initially be in an "on" state where each sub-module's series switching device 50 is on and each auxiliary switching device 52 is off. Thus, the module 22 is outputting zero voltage and is carrying current. In contrast, the bottom left arm 32 may initially be in an "off" state where each sub-module's series switching device 60 is off and each auxiliary switching device 62 is on. To block the desired 6 kV, for example, the sub-modules 38, 40, 42, 44, 46, and 48 need to be switched from the "on" state to the "off" state by operating their switches 50 and 52 and the sub-modules of the lower left arm 32 need to be switched from the "off" state to the "on" state by operating their switches. Further, the operation of the sub-modules in the upper right arm 34 and the lower right arm 36 may be the opposite. That is, the sub-modules of the lower right arm 36 may be operated the same as the sub-modules of the upper left arm 30 and the sub-modules of the upper right arm 34 may be operated the same as the sub-modules of the lower left arm 32. However, operating all of the switching devices of the sub-modules simultaneously may cause a high dV/dt and lead to EMI. Accordingly, sequential switching is used by operating one sub-module in the upper left arm 30, lower left arm 32, upper right arm 34, and lower right arm 36 at a time until all the sub-modules are switched appropriately.

More specifically, focusing on the operation of module 22 in the upper left arm 30 and module 24 of the lower left arm 32, a sub-module, such as sub-module 38, may be selected to operate first based on monitored sensor data or estimated voltage values, as will be described in detail below. In such an example, series switching device 50 is switched off and auxiliary switching device 52 is switched on, thereby receiving positive voltage 63 so the sub-module 38 will output voltage. At substantially the same time, a sub-module 64 in the lower left arm 32 may have its series switching device 60 turned on and its auxiliary switching device 62 turned off. Then, the next selected sub-module (e.g., sub-module 40) in the top left arm 30 may be pulsed according to an order determined by a capacitor voltage balancing algorithm described below so that its series switching device 50 is switched off and its auxiliary switching device 52 is switched on to output voltage. Additionally, another sub-module (e.g., sub-module 66) in the bottom left arm 32 may be pulsed to turn on its series switching device 60 and turn off its auxiliary switching device 62. The process may continue by operating another sub-module in the upper left arm 30 and the lower left arm 32 one at a time until all sub-modules have been switched. Further, the operation of the sub-modules in the upper right arm 34 and the lower right arm 36 may be reversed in that the operation of the sub-modules of the lower right arm 36 mirror the operation of the sub-modules of the upper left arm 30 and the operation of the sub-modules of the upper right arm 34 mirror the operation of the sub-modules of the lower left arm 32.

As this process progresses, the total voltage across the circuit 37 remains the same. When all sub-modules 38, 40, 42, 44, 46, and 48 have been operated in the upper left arm 30 the total cell voltage (e.g., 6 kV) is being blocked as the summation of the capacitors' voltages receiving positive voltage 63. The modified H-bridge 37 displayed may include a transformer 68 configured to modify (e.g., step up or step down) the blocked voltage as desired. An advantage of sequentially switching the sub-modules in steps as opposed to simultaneously switching them is that the dV/dt slope can be controlled, which may inhibit EMI.

Figure 4A:
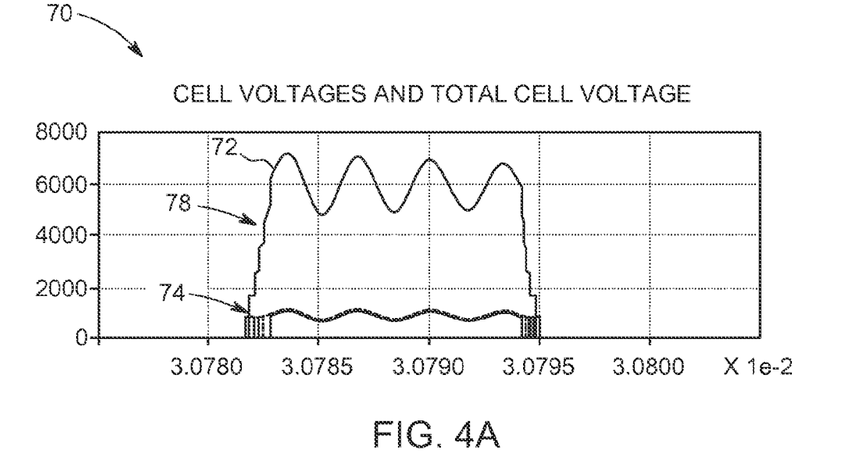
FIG. 4A is a waveform of total cell voltage across the modified H-bridge circuit of FIG. 2 and cell voltages across the sub-modules after sequential switching.
Figure 4B:
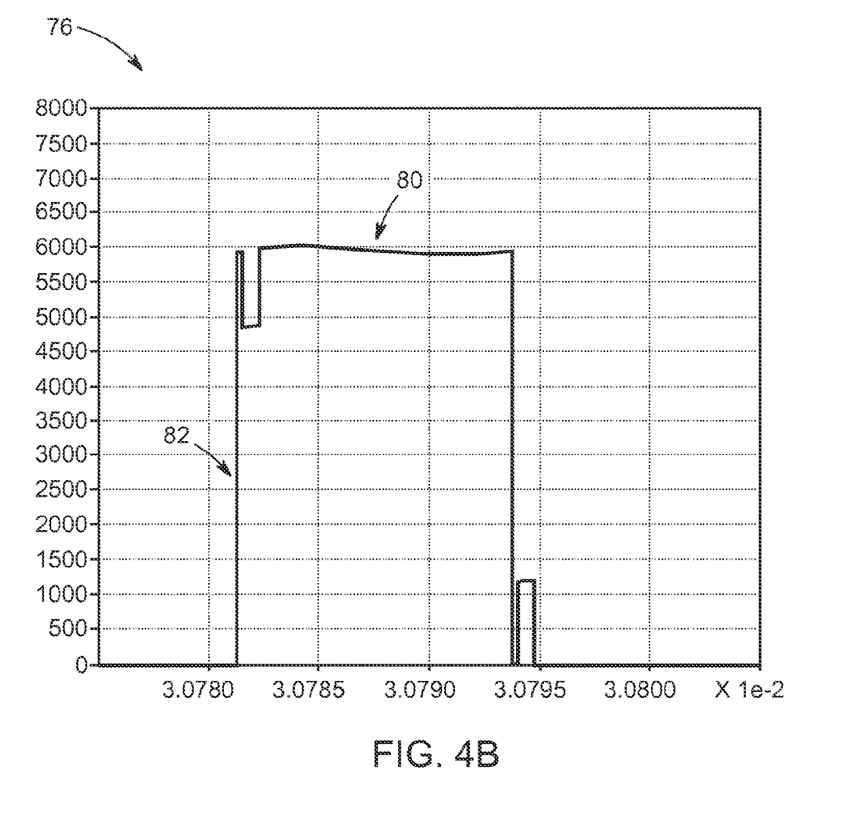
FIG. 4B is a waveform of voltage blocked by the H-bridge circuit of FIG. 1.

FIG. 4A is a waveform 70 of total cell voltage 72 across the modified H-bridge of FIG. 2 and cell voltages 74 across the sub-modules after sequential switching, and FIG. 4B is a waveform 76 of voltage blocked by the H-bridge circuit of FIG. 1. Starting with FIG. 4A, as depicted, each of the six sub-modules are operated sequentially so there are six individual cell voltages 74. It should be understood, that the cell voltages 74 may be regulated to oscillate evenly (e.g., around 1 kV). In other words, the current techniques regulate the amount of voltage output by each sub-module as near equivalently as possible. As may be seen by dV/dt slope 78, the change in voltage is gradual and increases in steps as the sub-modules are sequentially operated. Once all sub-modules are operated, the total cell voltage 72 is the summation of the six cell voltages 74. Thus, as illustrated, the total cell voltage 72 oscillates around 6 kV.

Comparatively, FIG. 4B shows a total cell voltage 80 that is relatively constant at 6 kV after switching a single switching device in the H-bridge from FIG. 1. However, as shown, the vertical dV/dt slope reflects the voltage increasing from 0 to 6 kV immediately. It should be noted that the steep dV/dt slope 82 generated by the near instantaneously large change in voltage may cause EMI. Thus, the current techniques overcome this disadvantage by enabling a controlled and gradual dV/dt that results from sequential switching of the sub-modules, as shown in FIG. 4A.

Figure 5:
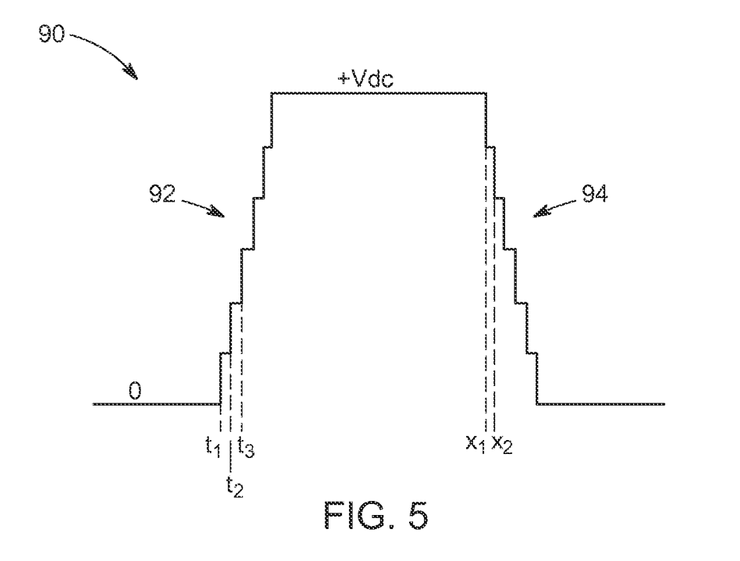
FIG. 5 is a pulse width modulation (PWM) waveform for controlling the instantaneous rate of voltage change (dV/dt) of the output voltage using sequential switching, in accordance with an embodiment.

A closer view of the voltage waveform 90 including stepped leading and trailing edges 92 and 94, respectively, that results from sequentially switching the sub-modules is shown in FIG. 5. The waveform 90 represents PWM with a controlled dV/dt of output voltage, in accordance with an embodiment. For example, to block a desired high voltage, at a first time (t1), a first sub-module may be selected from the upper arm of the H-bridge circuit and pulsed to operate by turning on its auxiliary switching device and turning off its series switching device. Accordingly, its capacitor's voltage will be output through the circuit. Likewise, a first sub-module may be selected from the lower arm of the H-bridge circuit and pulsed to operate by turning on its series switching device and turning off its auxiliary switching device. At a second time (t2), a second sub-module may be selected in the upper arm of the H-bridge circuit and pulsed to operate by turning on its auxiliary switching device and turning off its series switching device. Also, a second sub-module may be selected from the lower arm of the H-bridge circuit and pulsed to operate by turning on its series switching device and turning off its auxiliary switching device. The total cell voltage at t2 is the sum of the output voltage from the first and the second sub-module's upper arm.

Then, at a third time (t3), a third sub-module may be selected from the upper arm and pulsed to operate by turning on its auxiliary switching device and turning off its series switching device to allow its capacitor to output voltage, and a third sub-module may be selected from the lower arm and pulsed to turn off its auxiliary switching device and turn on its series switching device. As may be seen, the process of sequentially selecting and operating sub-modules may continue for however many sub-modules there are in the upper and lower arms or until a desired voltage is blocked. As a result, the change in voltage is regulated over time to inhibit a large dV/dt, which results in the illustrated "steps" of the leading edge 92. In the depicted embodiment, there are six sub-modules that are operated and it should be noted that, as shown, the amplitude (e.g., amount of voltage output) of each is nearly equivalent.

The process may be repeated, but reversed, when turning off power. For example, in order for the H-bridge to output 0 voltage, at a first time (x1) a first sub-module may be selected from the upper arm and pulsed to operate by turning on its series switching device and turning off its auxiliary switching device so that its capacitor is no longer outputting positive voltage. Likewise, a first sub-module may be selected from the lower arm and pulsed to operate by turning on its auxiliary switching device and turning off its series switching device. Then, at a second time (x2), the second sub-modules may be selected in the upper and lower arm and pulsed to operate. The sub-modules may continue to be selected and operated in the upper and lower arms one at a time to control the dV/dt of the output voltage until 0 voltage is output. As a result, the sequential switching may generate "steps," as shown by the trailing edge 94 of the voltage waveform 90 when turning off power.

Figure 6:
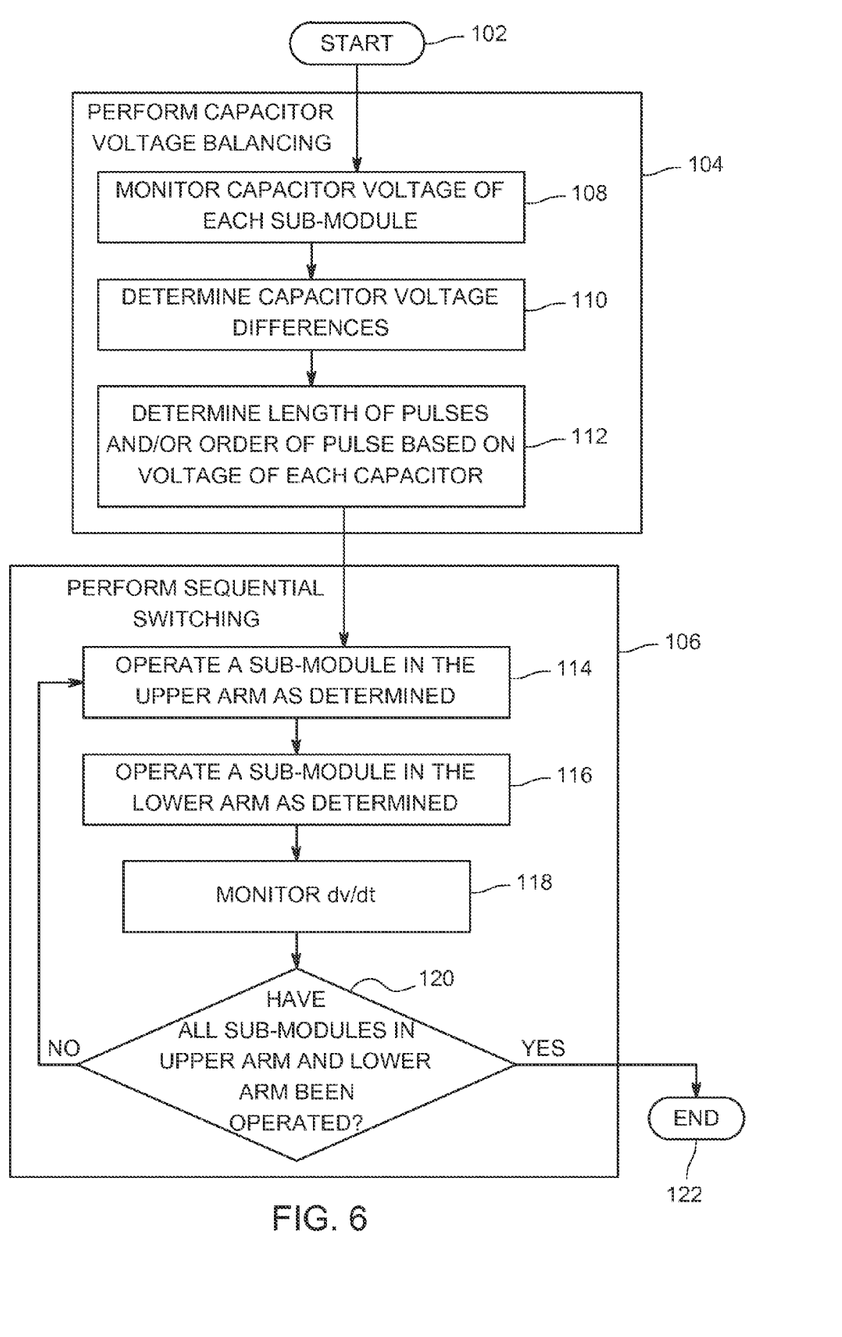
FIG. 6 is a flow diagram of a process suitable for capacitor voltage balancing and sequentially switching sub-modules in the modified H-bridge to actively balance capacitor voltage and control dV/dt, in accordance with an embodiment.

FIG. 6 is a flow diagram of a process 100 suitable for sequentially switching sub-modules in the modified H-bridge to actively balance capacitor voltage and control dV/dt, in accordance with an embodiment. The process 100 may begin at circle 102 and include performing capacitor voltage balancing (e.g., sorting or rotating algorithm) of sub-modules (process block 104) and performing sequential switching of sub-modules (process block 106) as determined by the capacitor voltage balancing algorithm. Starting with process block 104, the capacitor voltage balancing algorithm may include monitoring capacitor voltage of each sub-module (process block 108), determining capacitor voltage differences (process block 110), determining the length of each sub-modules pulse and/or the order in which to pulse the sub-modules based on the capacitors' voltages in order to nearly equivalently regulate the capacitors' voltages (process block 112). The capacitor voltage balancing algorithm (process block 104) may be implemented as computer instructions stored on one or more non-transitory, computer readable mediums (e.g., memories or data storage devices) and executed by one or more analog or digital controllers (e.g., processors). In some embodiments, the capacitor voltage balancing algorithm may be implemented using logic gates in a circuit, such as an application-specific integrated circuit (ASIC).

As previously discussed, it is desirable for the voltages of the sub-modules' capacitors to be nearly equivalent when operated. Thus, the capacitor voltage balancing algorithm 104 enables regulating the capacitors' voltages by using one or more sensors across each sub-module to monitor the capacitors' voltages (process block 108). The one or more sensors may be communicably coupled to the one or more controllers and configured to transmit measured voltage, current, temperature, or the like. In some embodiments, an observer algorithm may measure the supplied current and use the measured current with the size of the storage element (e.g., capacitor) to estimate the values of the voltages without the use of a sensor. Based on the acquired sensor data or estimated voltage values, the capacitor voltage balancing algorithm 104 may determine differences between the capacitors' voltages, such as which capacitor voltage is the highest, lowest, or at the desired voltage (process block 110). Using this determination, the capacitor voltage balancing algorithm 104 may determine the length of the pulse that each sub-module should receive or the order in which to pulse the sub-modules (process block 112). For example, a sub-module with a capacitor outputting a higher voltage than the other sub-modules' capacitors may not require the same length pulse as the other capacitors to output the same desired voltage. Alternatively, a sub-module with a capacitor outputting a lower voltage than the other sub-modules' capacitors may require a longer pulse than the other capacitors to adequately charge and output the same desired voltage. In other words, the length of the pulse determines the amount of current that flows through the capacitor and the pulse length can be modified based on how quickly the individual capacitors take to charge or discharge. Therefore, the capacitor voltage balancing algorithm may determine that some sub-modules' pulses are shorter or longer based on the characteristics of their capacitors' output voltage.

Likewise, the order in which the sub-modules are pulsed may be determined by the capacitor voltage balancing algorithm based on the determined pulse that each sub-module is to receive. For example, in one embodiment, a sub-module that is determined to receive the shortest pulse may be operated last during sequential switching, and a sub-module that is determined to receive the longest pulse may be operated first. Further, sub-modules determined to receive shorter or longer pulses may be ordered to be pulsed from later to earlier, respectively. Performing the pulsing in this order may enable all the sub-modules to be on (e.g., auxiliary switching devices on) at the same time so their capacitors are supplying power through the circuit and the desired voltage can effectively be blocked. That is, as noted above, the total cell voltage of all sub-modules is the summation of their capacitors' output voltage. Thus, if each sub-modules' capacitors are regulated to output 1 kV and 6 kV is the desired voltage to be blocked, then six sub-modules will need to have their auxiliary switching devices on in an upper arm receiving positive voltage to block the desired 6 kV.

After the capacitor voltage balancing algorithm (process block 104) has determined the length of pulses for each sub-module and the order in which to operate the sub-modules, the process 100 may perform sequential switching (process block 106). Sequential switching (process block 106) may include operating a sub-module in the upper arm as determined by the capacitor voltage balancing algorithm (process block 114), operating a sub-module in the lower arm as determined (process block 116), monitoring dV/dt of the output voltage (process block 118), and determining whether all sub-modules in the upper arm and lower arm have been operated (decision block 120). If all sub-modules in the arms have been operated, the process 100 may end at circle 122, and if all of the sub-modules in the arms have not been operated, the process 100 may return to process block 114 to operate another sub-module in the upper arm and continue accordingly.

More specifically, sequential switching (process block 106) may use the capacitor voltage balancing algorithm results to operate the first selected sub-module in the upper arm in the determined order by pulsing its auxiliary switching device on and its series switching device off for the determined length of time in process block 106. At substantially the same time, the first selected sub-module in the lower arm in the determined order may be operated by pulsing its series switching device on and its auxiliary switching device off for the determined length of time in process block 108. While the sub-modules in the upper and lower arms are being operated, the change in voltage over time (dV/dt) may be monitored (process block 118) to ensure that the sub-modules are not being operated so quickly to create a high dV/dt. For example, if the instantaneous rate of change of voltage becomes too high, the length of time between sub-module switches (e.g. pulse timing) may be extended. As should be understood in light of this disclosure, the dV/dt can be controlled by switching the sub-modules in steps, rather than simultaneously, which may reduce or eliminate EMI.

Then, one or more controllers executing the sequential switching (process block 106) may determine if all the sub-modules of the upper arm and lower arm have been operated that are selected to block the desired voltage. If all sub-modules of the upper arm and the respective lower arm have been operated, then the process 100 may end 122. For example, if there are six sub-modules regulated to output 1 kV of voltage and the desired voltage to be blocked is 3 kV, then sequential switching (process block 106) may stop after three sub-modules' auxiliary switching devices have been turned on in the upper arm receiving positive voltage. However, if all of the sub-modules of the upper arm and the respective lower arm have not been operated, the sequential switching (process block 106) process may return to process block 114 to operate the next selected sub-module as determined by the capacitor voltage balancing algorithm (process block 104) and the process may continue until the desired voltage is blocked.

It should be understood, that the capacitor voltage balancing algorithm (process block 104) and sequential switching of sub-modules (process block 106) may be used for both turning power on and off. In both scenarios, the voltage to the sub-modules can be actively balanced to prevent loss and the dV/dt of the output voltage can be controlled to inhibit EMI. Also, in other embodiments, any desired high voltage can be produced by adding sub-modules or the desired voltage may be reduced by removing sub-modules from the series connection. It should be further understood that in some embodiments sequential switching of the sub-modules (process block 106) may be done without performing capacitor voltage balancing. That is, the sub-modules may be pulsed one at a time until all sub-modules are operated without determining the pulse length or the order in which to operate the sub-modules. Indeed, the order of sub-module operation and the pulse length may be preconfigured or, alternatively, the order of sub-module operation and pulse length may be randomly generated. However, in such embodiments, the output voltages of the capacitors are not actively balanced.

Figure 7:
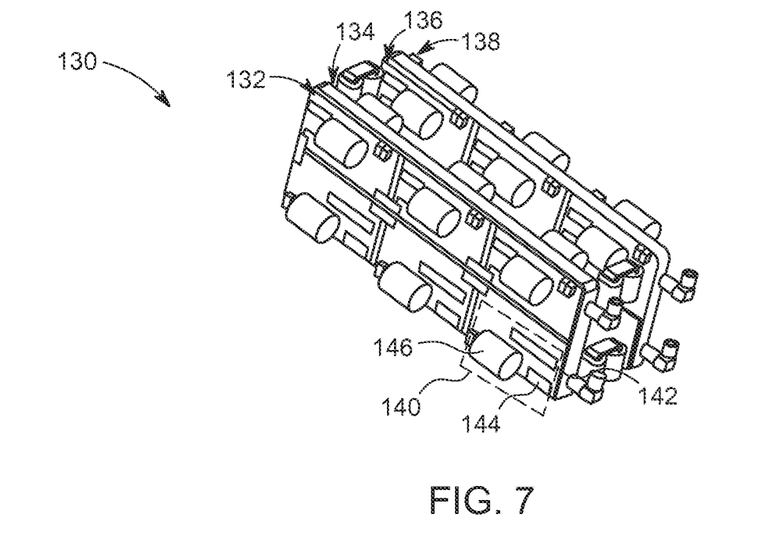
FIG. 7 is a perspective view of an electronic device implementing the modified H-bridge circuit of FIG. 1, in accordance with an embodiment.

FIG. 7 is a perspective view of an electronic device 130 implementing the modified H-bridge circuit of FIG. 2, in accordance with an embodiment. As illustrated, the modified H-bridge electronic device 130 includes four arms, the upper left arm 132, the bottom left arm 134, the upper right arm 136, and the lower right arm 138. Each arm 132, 134, 136, and 138 includes six sub-modules 140. The sub-modules 140 are electrically connected in series on each arm 132, 134, 136, and 138. Each sub-module 140 includes a series switching device 142 and an auxiliary switching device 144 that leads to a capacitor 146. The series switching device 142 may include four low voltage switching devices in parallel and the auxiliary switching device 144 may include two low voltage switching devices in parallel. Thus, each arm 132, 134, 136, and 138 may include thirty-six low voltage switching devices. As previously mentioned, in some embodiments the low voltage switching devices may include 1.2 kV or 1.7 kV SiC MOSFETs. In one implementation, the size of one sub-module 140 may include a height of 5.5" and a width of 2.75", which provides a total dimension of the modified H-bridge electronic device 130 of 19" height×9" width×6.5" depth (1111.5 cubic inches).

Technical effects of the present disclosure include connecting low voltage power devices in series to act as a single high voltage power device. The techniques include controlling the dV/dt of the output voltage by using sequential switching to inhibit EMI and actively balancing the voltages across low voltage power devices by using a capacitor voltage balancing algorithm to inhibit power losses. Further, using certain low voltage power devices, such as 1.2 kV or 1.7 kV SiC MOSFETs, may be particularly beneficial due to their high power density, high frequency of operation, and low switching losses, among other things.

This written description uses examples to disclose the present techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A switching device system comprising:
a first upper arm electrically coupled to a first lower arm;
wherein each of the arms comprise a plurality of low voltage sub-modules connected in series, each plurality of low voltage sub-modules comprising a series switching device, an auxiliary switching device, and a storage element, and each plurality of low voltage sub-modules configured to be sequentially switched using the series switching device and the auxiliary switching device separately in the first upper arm and the first lower arm to control the change in the arms output voltage with a reduced rate of change (dV/dt).

2. The system of claim 1, comprising a controller configured to execute a capacitor voltage balancing algorithm to determine the length of time to pulse each plurality of low voltage sub-modules and the order in which to pulse each plurality of low voltage sub-modules based on sensor data obtained via one or more sensors to actively balance the voltage produced by each capacitor near equivalently.

3. The system of claim 2, wherein the sensor data comprises a voltage level of the capacitor of each plurality of low voltage sub-modules.

4. The system of claim 1, comprising one or more sensors electrically coupled to each plurality of low voltage sub-modules and configured to measure voltage, current, temperature, or some combination thereof.

5. The system of claim 1, wherein the series switching device and the auxiliary switching device of each plurality of low voltage sub-modules comprises silicon-carbide (SiC) metal oxide field-effect transistors (MOSFETs) or other power semiconductor devices.

6. The system of claim 1, wherein selectively blocking a desired high voltage by sequential switching comprises turning the auxiliary switching device on and turning the series switching device off of one of the plurality of low voltage sub-modules of the first upper arm and turning the series switching device on and turning the auxiliary switching device off of one of the plurality of low voltage sub-modules of the first lower arm and repeating after a delay for the next one of the plurality of low voltage sub-modules of the first upper arm and first lower arm until all of the first upper arm's auxiliary switching devices are on and series switching devices are off and all of the first lower arm's series switching devices are on and auxiliary switching devices are off.

7. The system of claim 1, comprising an observer algorithm executed by a controller, the observer algorithm configured to estimate voltage output by each of the plurality of sub-modules and to return the estimated voltages to be used by the controller to execute a capacitor voltage balancing algorithm.

8. The system of claim 1, wherein sequentially switching the auxiliary switching device and series switching device of the plurality of low voltage sub-modules to control dV/dt comprises using a controller configured to monitor the change in voltage via one or more sensors after each switch and to adjust a time delay between switches accordingly.

9. The system of claim 1, wherein each series switching device of the plurality of low voltage sub-modules comprises a number of SiC MOSFETs in parallel and each auxiliary switching device comprises half the number of SiC MOSFETs in parallel as the series switching device.

10. The system of claim 1, comprising a second upper arm electrically coupled to a second lower arm forming an H-bridge converter, or a plurality of upper arms electrically coupled to a plurality of respective lower arms, wherein each of the arms comprise a plurality of low voltage sub-modules connected in series, each plurality of low voltage sub-modules comprising a series switching device, an auxiliary switching device, and a storage element, and each plurality of low voltage sub-modules configured to be sequentially switched using the series switching device and the auxiliary switching device separately in the arms to control the change in the arms output voltage with a reduced rate of change (dV/dt).

11. A method of operating a switching device, comprising:
monitoring output voltages from capacitors of a plurality of low voltage sub-modules connected in a series on at least an upper arm and a lower arm, wherein the upper arm is electrically coupled to the lower arm;
determining differences in the output voltages of the capacitors;

determining lengths of pulses for each of the plurality of sub-modules based on the determined differences;

determining an order to pulse the plurality of sub-modules based on the determined length of pulses; and operating the plurality of sub-modules using the determined pulse lengths and pulse order to output a desired high voltage.

12. The method of claim 11, wherein operating the plurality of low voltage sub-modules using the determined pulse lengths and pulse order to output a desired high voltage comprises switching the plurality of low voltage sub-modules of the arms sequentially according to the order to control change in voltage over time (dV/dt).

13. The method of claim 12, wherein switching the plurality of low voltage sub-modules of the arms sequentially according to the order comprises operating one of the plurality of low voltage sub-modules first in the order in the upper arm by turning an auxiliary switching device on and turning a series switching device off, operating one of the plurality of low voltage sub-modules first in the order in the lower arm by turning a series switching device on and turning an auxiliary switching device off, and determining whether all of the plurality of low voltage sub-modules have been operated in the upper arm and lower arm and, if not, repeating the process by operating the next one of the plurality of low voltage sub-modules in the order in the upper arm and the lower arm.

14. The method of claim 11, wherein determining differences in the voltages of the capacitors comprises determining which capacitors output higher or lower voltages and determining lengths of pulses for each of the plurality of sub-modules based on the differences comprises setting the pulse length shorter for a capacitor with higher voltage and setting the pulse length longer for a capacitor with lower voltage to regulate capacitor output voltage near equally.

15. The method of claim 11, wherein monitoring output voltage from the capacitors comprises using one or more sensors electrically coupled with each of the plurality of low voltage sub-modules.

16. A method for operating a switching device, comprising:

sorting or rotating a plurality of low voltage sub-modules electrically connected in a series in an upper arm and a lower arm to actively balance the output voltage of capacitors of each of the plurality of low voltage sub-modules near equivalently, wherein the upper arm is electrically coupled to the lower arm; and switching the plurality of low voltage sub-modules sequentially as determined during the sorting or rotating to control change in voltage over time (dV/dt) and to output a desired high voltage.

17. The method of claim 16, wherein sorting or rotating the plurality of low voltage sub-modules comprises monitoring output voltages from the capacitors via one or more sensors, determining differences in the output voltages of the capacitors, determining lengths of pulses for each of the plurality of low voltage sub-modules based on the determined differences, and determining an order to pulse the plurality of low voltage sub-modules based on the determined lengths of pulses.

18. The method of claim 17, wherein switching the plurality of low voltage sub-modules sequentially as determined during the sorting or rotating comprises operating one of the plurality of low voltage sub-modules first in the order in the upper arm by turning a auxiliary switching device on and turning a series switching device off so a capacitor supplies power, operating one of the plurality of low voltage sub-modules first in the order in the lower arm by turning a series switching device on and turning an auxiliary switching device off, and determining whether all of the plurality of low voltage sub-modules have been operated in the arms and, if not, repeating the process after a delay by operating the next one of the plurality of low voltage sub-modules in the order in the arms.

19. The method of claim 16, comprising monitoring the output voltage from the plurality of low voltage sub-modules, via one or more voltage sensors, during sequential switching and adjusting pulse timings for the plurality of low voltage sub-modules to control dV/dt based on the monitored output voltages.

20. The method of claim 16, wherein the plurality of low voltage sub-modules comprise SiC MOSFETs or other power semiconductor devices.

* * * * *